(12) United States Patent
Goldstein et al.

(10) Patent No.: US 10,120,140 B2
(45) Date of Patent: *Nov. 6, 2018

(54) CONNECTOR AND DUPLEX CONNECTOR ASSEMBLY

(71) Applicant: Fluke Corporation, Everett, WA (US)

(72) Inventors: Seymour Goldstein, Austin, TX (US); Ian Michael Davidson, Didcot (GB)

(73) Assignee: Fluke Corporation, Everett, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/798,229

(22) Filed: Oct. 30, 2017

(65) Prior Publication Data

US 2018/0210155 A1    Jul. 26, 2018

Related U.S. Application Data

(63) Continuation of application No. 15/415,119, filed on Jan. 25, 2017, now Pat. No. 9,823,428.

(51) Int. Cl.
   *G02B 6/00* (2006.01)
   *G02B 6/38* (2006.01)

(52) U.S. Cl.
   CPC ......... *G02B 6/3893* (2013.01); *G02B 6/3821* (2013.01); *G02B 6/3825* (2013.01); *G02B 6/3885* (2013.01)

(58) Field of Classification Search
   CPC .. G02B 6/3893; G02B 6/3885; G02B 6/3821; G02B 6/3825
   See application file for complete search history.

(56) References Cited

U.S. PATENT DOCUMENTS

| | | |
|---|---|---|
| 5,461,690 A | 10/1995 | Lampert |
| 5,481,634 A | 1/1996 | Anderson et al. |
| 5,579,425 A | 11/1996 | Lampert et al. |
| 5,638,474 A | 6/1997 | Lampert et al. |
| 5,647,043 A | 7/1997 | Anderson et al. |
| 5,719,977 A | 2/1998 | Lampert et al. |
| 6,017,153 A * | 1/2000 | Carlisle ............... G02B 6/3821 385/56 |
| 6,206,581 B1 | 3/2001 | Driscoll et al. |
| 7,147,384 B2 | 12/2006 | Hardcastle et al. |
| 7,189,008 B2 | 3/2007 | Dye |
| 7,481,664 B1 | 1/2009 | Knoll et al. |
| RE41,933 E | 11/2010 | Cheng et al. |
| 8,070,367 B2 | 12/2011 | Winberg et al. |
| 8,753,022 B2 | 6/2014 | Schroeder et al. |
| 8,840,419 B2 | 9/2014 | Huang |

(Continued)

FOREIGN PATENT DOCUMENTS

| | | |
|---|---|---|
| JP | 2014186274 A | 10/2014 |
| WO | 2011022728 A1 | 2/2011 |

OTHER PUBLICATIONS

Extended European Search Report for European Application No. 18153410.8-1001, dated Jun. 8, 2018, 10 pages.

*Primary Examiner* — Ellen Kim
(74) *Attorney, Agent, or Firm* — Seed Intellectual Property Law Group LLP

(57) ABSTRACT

Connectors and a duplex clip for forming duplex connector assemblies are provided herein. The connector includes a rigid latch member for positive locking with another component, such as an adaptor. The duplex clip is configured to hold two connectors to form a duplex connector assembly.

21 Claims, 12 Drawing Sheets

(56) References Cited

U.S. PATENT DOCUMENTS

| | | | |
|---|---|---|---|
| 8,864,390 B2 | 10/2014 | Chen et al. | |
| 8,876,405 B2 | 11/2014 | Larson et al. | |
| 9,146,364 B2 | 9/2015 | Chen et al. | |
| 9,151,909 B2 | 10/2015 | Chen et al. | |
| 9,448,370 B2* | 9/2016 | Xue | G02B 6/38 |
| 9,482,820 B1 | 11/2016 | Barwicz et al. | |
| 9,595,786 B1* | 3/2017 | Takano | H01R 13/6275 |
| 2012/0155810 A1* | 6/2012 | Nakagawa | G02B 6/3878 |
| | | | 385/78 |
| 2014/0056562 A1* | 2/2014 | Limbert | G02B 6/36 |
| | | | 385/77 |
| 2014/0148039 A1 | 5/2014 | Huang | |
| 2015/0030289 A1* | 1/2015 | Jiang | G02B 6/3898 |
| | | | 385/76 |

* cited by examiner

CONNECTOR AND DUPLEX CONNECTOR ASSEMBLY

BACKGROUND

Technical Field

The present disclosure generally pertains to connectors and duplex connector assemblies.

Description of the Related Art

Optical communication links, such as fiber optical cables, provide high speed transmission of data with relatively low loss. In order to allow for ease of adjusting networks of communication links, such as coupling and decoupling to various components or joining segments of fibers into longer lengths, each end of the fiber optical cable is held by an optical connector.

Generally described, optical connectors hold the end of the fiber optical cable in position and engage with another component, such as an adaptor, to align the held fiber optical cable with another fiber optical cable, which may also be held by an optical connector. In the adaptor, the two optical connectors are designed to align the endfaces of the two fiber optical cables being held by the respective optical connectors and to abut the endfaces in physical contact with each other so that optical signals can travel between the abutting fiber optical cables.

As mentioned above, optical connectors allow for ease of coupling and decoupling various optical fibers together. Some optical connectors, such as LC optical connectors, which may also be referred to as local optical connectors, have a flexible member that is integrally formed with a housing. The integrally formed flexible member is used to couple and decouple the optical connector from an adaptor or component that receives the optical connector. Repeated flexing of the flexible member can cause fatigue in the flexible member of the optical connector, thereby shortening the life of the connector. This is particularly problematic for optical connectors used on test cords with test equipment, which are subjected to unusually high usage.

BRIEF SUMMARY

Embodiments are directed to connectors and a duplex clip for forming duplex connector assemblies. One or more embodiments are directed to increasing the life span of a connector.

One embodiment is directed to a connector including a housing having an outer surface and a cavity. A ferrule assembly is located in the cavity of the housing. The housing includes a rigid latch member having a first end removably and rotatably secured to the housing and a second end spaced apart from the housing. The latch member includes engagement members that are configured to engage with another component when in an engagement position. The connector further includes a retainer spring having a first end abutting the housing and a second end abutting the latch member. The retainer spring is configured to provide a force that pushes the second end of the latch member away from the housing. The connector further includes a latch retainer configured to counteract the force provided by the retainer spring. The retainer spring and the latch retainer together are configured to place the latch member in the engagement position.

Another embodiment is directed to a connector component comprising a housing including an opening configured to receive a ferrule assembly and a rigid latch member. The latch member has a first end removably and rotatably engaged with the housing and a second end spaced apart from the housing. The latch member includes engagement members configured to engage with another component when in an engagement position. The connector component further includes a retainer spring between the housing and the latch member. The retainer spring is configured to provide a force that pushes the second end of the latch member away from the housing. The connector component further includes a latch retainer configured to counteract the force provided by the retainer spring. The retainer spring and the latch retainer together are configured to place the latch member in the engagement position.

Other embodiments are directed to duplex connector assemblies. One embodiment is directed to a duplex connector assembly comprising a duplex clip. The duplex clip includes first and second curved members that are coupled together by a bridge member and first and second tabs extending from the first and second curved members. First and second connectors are held by the first and second curved members, respectively. The first and second connectors include latch retainers, respectively, that include protrusions that engage with the first and second tabs of the duplex clip.

BRIEF DESCRIPTION OF THE SEVERAL VIEWS OF THE DRAWINGS

In the drawings, identical reference numbers identify similar elements. The sizes and relative positions of elements in the drawings are not necessarily drawn to scale.

DETAILED DESCRIPTION

Figure 1A:
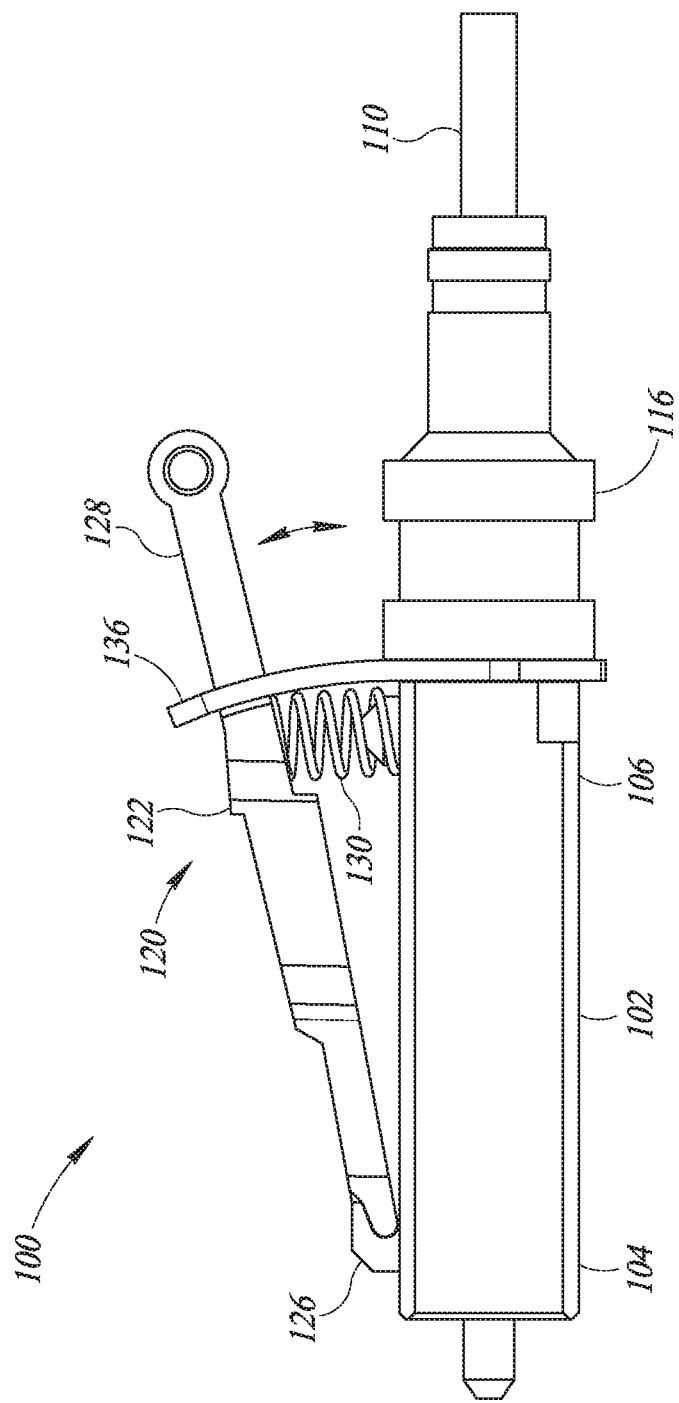
FIG. 1A is a schematic illustration of a side view of an optical connector in accordance with one embodiment.

It will be appreciated that, although specific embodiments of the present disclosure are described herein for purposes of illustration, various modifications may be made without departing from the spirit and scope of the present disclosure.

Embodiments are directed to connectors and a duplex clip for forming duplex connector assemblies. In particular, one embodiment is directed to latching systems for connectors. The latching systems allow the connectors to engage with and disengage from a separate component, such as an adaptor or a port for equipment. The latching system includes a rigid body that is rotatably coupled to the housing at a first end A spring is located between the rigid body and the housing that allows a user to disengage the latching system from a separate component by pressing on a second end of the rigid body. The latching system further includes a latch retainer, that in conjunction with the spring, is configured to place the rigid body in position for engagement with the separate component upon the user releasing the end of the rigid body. It is to be appreciated, the rigid body docs not have to flex to engage and disengage with the component, such as the adaptor or the test port. Thus, the life of the latching system may be extended, thereby extending the life of the connector.

FIGS. 1A-1D illustrate various views of an optical connector 100 in accordance with one embodiment The optical connector 100 is an LC optical connector that includes a housing 102 having a first end 104 and a second end 106. The housing 102 is a hollow body that includes a cavity 108 (FIG. 1C) extending from the first end 104 to the second end 106 The cavity 108 receives a ferrule assembly 110 so that an end of a ferrule tube held by the ferrule assembly 110 extends from the first end 104 of the housing 102 exposing an endface of a fiber optical cable. The ferrule assembly 110 is a standard ferrule assembly and, thus, the details of ferrule assembly 110 will not be described in detail in the interest of brevity.

A portion of an inner surface of the housing 102 that defines the cavity 108 is shaped to correspondingly engage with the ferrule assembly 110. For instance, the inner surface of the housing 102 has a hex-shaped portion that engages with a hex-shaped portion of the ferrule assembly 110. The inner surface of the housing 102 also includes a tapered portion proximate the corresponding hex-shaped portion. When the ferrule assembly 110 is located inside the housing 102, the ferrule assembly 110 is pressed against the tapered portion by a compression spring 114 and aback ferrule retainer 116 The back ferrule retainer 116 holds the ferrule assembly 110 in the housing 102 and engages in a locking manner with the housing 102 at the second end 106, which may involve a protrusion of the back ferrule retainer 116 being received in an opening of the housing 102.

An outer surface of housing 102 includes a latching system 120 that is configured to engage and disengage the optical connector 100 with other optical components, such as adaptors or ports for optical equipment, in order to align the fiber optic cable of the ferrule assembly 110 win another fiber optic cable.

The rigid latch member 122 has an inner surface facing the housing 102 and an outer surface. A first end 124 of the latch member 122 is rotatably coupled to the outer surface of the housing 102. In the illustrated embodiment of FIGS. 1A-1D, the first end 124 of the latch member 122 is located in z recess of a housing hook 126 on the outer surface of the housing 102 forming a hinge joint. The first end 124 of the latch member 122 is configured to pivot or rotate in the recess of the housing hook 126 so that the second end 128 of the latch member 122 moves toward and away from the housing 102 as indicated by the arrow in FIG. 1A.

Figure 1B:
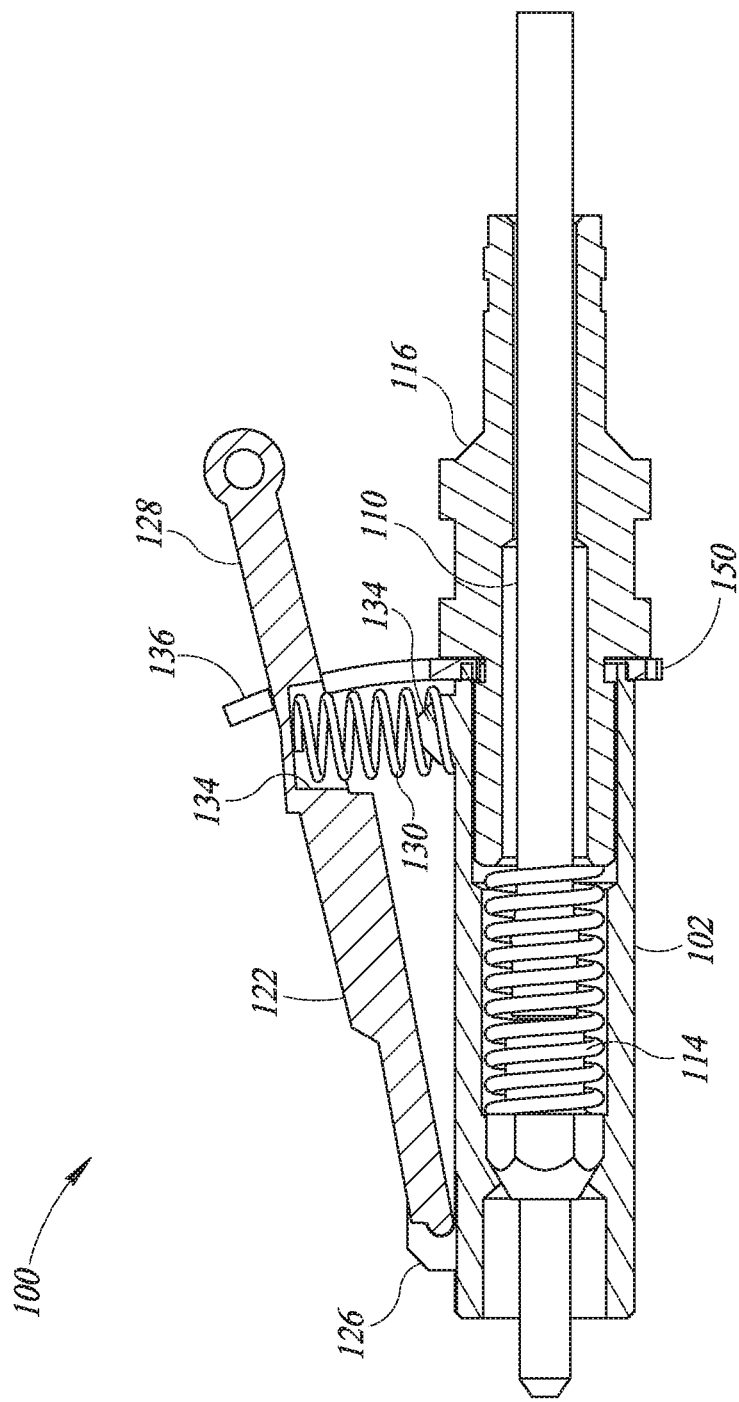
FIG. 1B is a schematic illustration of a cross-sectional view of the optical connector of FIG. 1A.
Figure 1C:
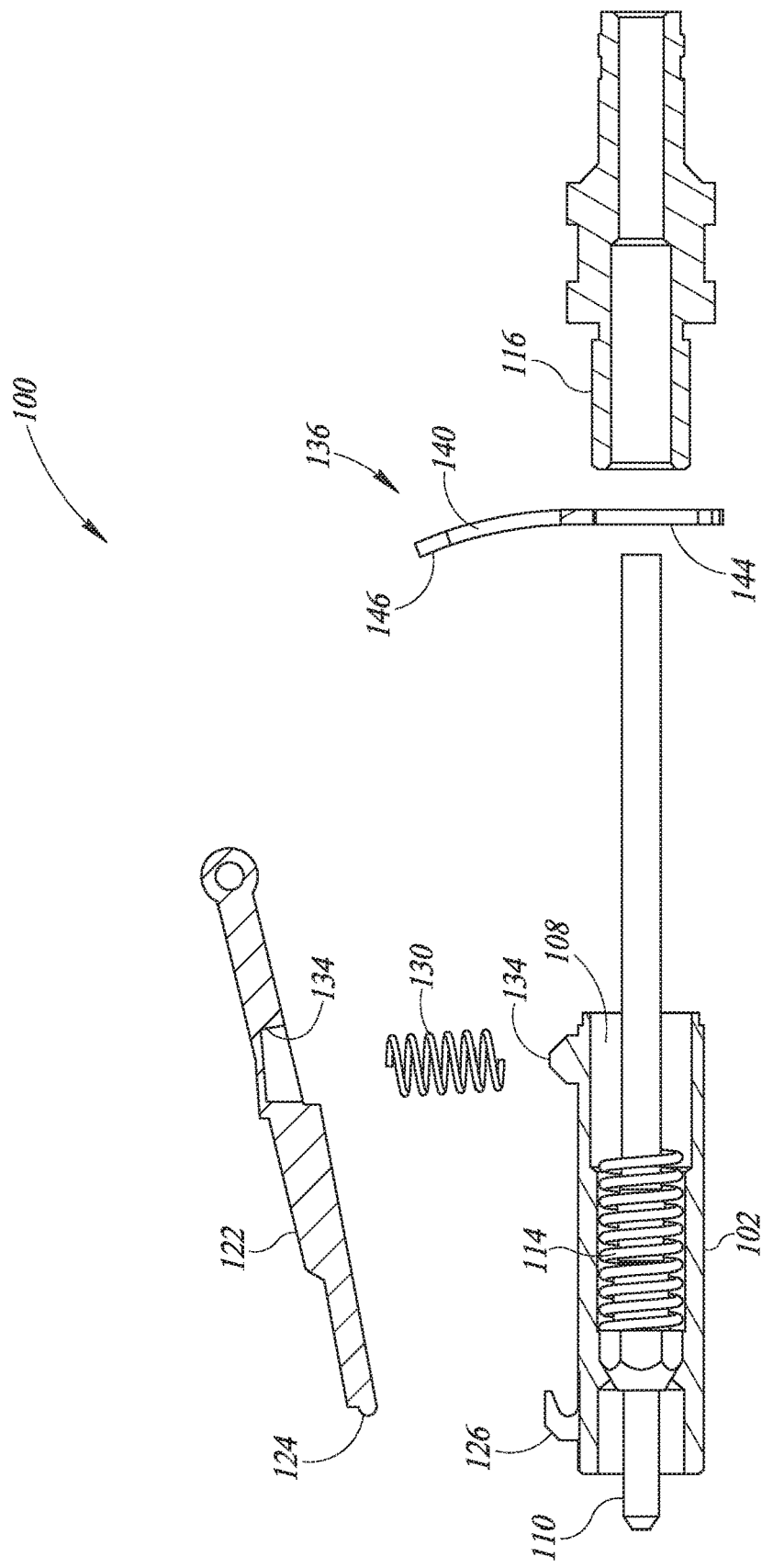
FIG. 1C is a schematic illustration of a partial exploded view of the optical connector of FIG. 1B.

A second end 128 of latch member 122 is held away from the housing 102. In particular, the second end 128 of the latch member 122 is held away from the housing 102 by a retainer spring 130. The retainer spring 130 is a compression spring that is held in position by the housing 102 and the latch member 122. In particular, a first end of the retainer spring 130 rests on a raised portion 132 of the housing 102 and a second end rests in a recess 134 of the latch member 122. In that regard, the raised portion 132 of the housing 102 and the recess 134 of the latch member 122 hold the retainer spring 130 in position. In other embodiments, the both the housing 102 and the latch member 122 have recesses or raised portions for holding the retainer spring 130. Alternatively, the housing 102 may include a recess and the latch member 122 may include a raised portion. In yet other embodiments, the retainer spring 130 is coupled to one of or both the latch member 122 and the housing 102 by adhesive or welding joints. While the retainer spring 130 is illustrated in FIGS. 1A-1C as a coil spring, other forms of springs may alternatively be used, including leaf springs.

The second end 128 of the latch member 122 is not only held in position by the retainer spring 130, but also by a latch retainer 136. In particular, a cross member 146 of the latch retainer 136 is provided to counteract the force being applied to latch member 122 by the retainer spring 130, which pushes the latch member 122 away from the housing 102. In that regard, as will be understood by persons of ordinary skill in the art, the combination of the retainer spring 130 and the latch retainer 136 holds the latch member 122 in an engagement position for locking the optical connector 100 in another component, such as an adaptor. The latching system 120 includes a rigid latch member 122 that locks the optical connector 100 in place within the adapter or port by engagement members 152.

Figure 2:
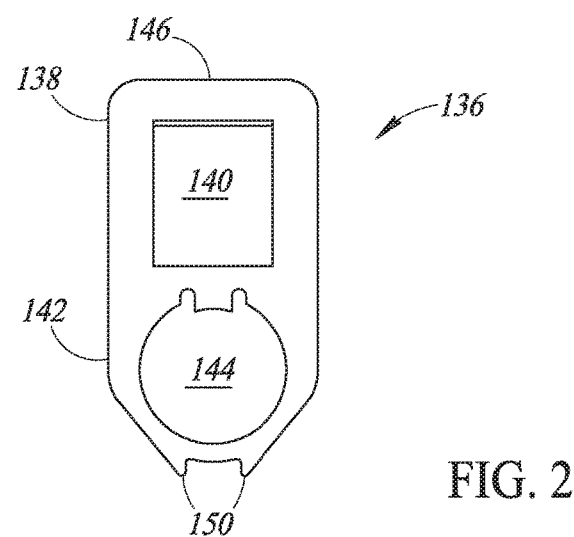
FIG. 2 is a schematic illustration of a front view of a latch retainer of the optical connector in FIG. 1A.

A front view of the latch retainer 136 is shown in FIG. 2. The latch retainer 136 includes an upper portion 138 that includes an upper through opening 140 and a lower portion 142 that includes a lower through opening 144. The upper portion 142 includes a cross member 146. The latch member 122 extends through the upper through opening 140 of the latch retainer 136. The cross member 146 of the upper portion 138 presses against the latch member 120 and counteracts the spring force generated by the retainer spring 130 that pushes the latch member 122 away from the housing 102.

Figure 1D:
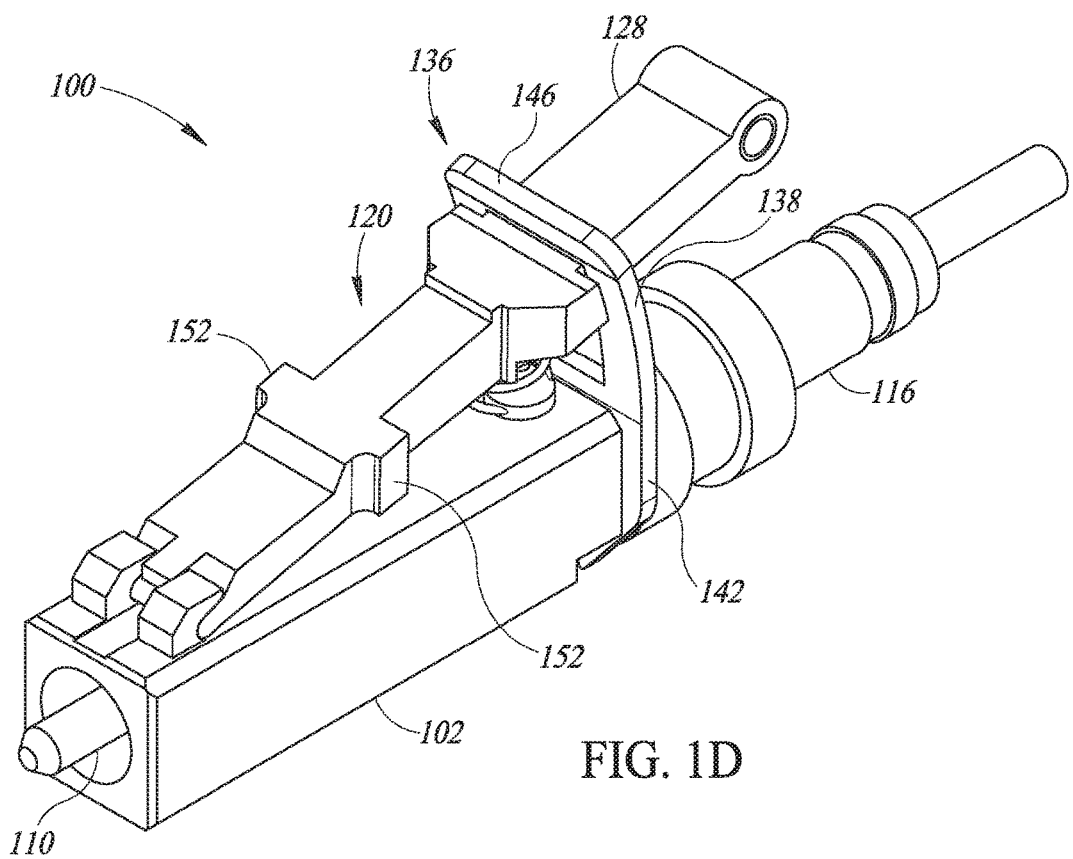
FIG. 1D is a schematic illustration of a front isometric view of the optical connector of FIG. 1A.

The lower through opening 144 of the lower portion 142 of the latch retainer 136 is aligned with the cavity 108 at the second end 106 of the housing 102 as best shown in FIG. 1D. The ferrule assembly 110 and the ferrule retainer 116 extend through the lower through opening 144 of the latch retainer 136. The lower portion 142 of the latch retainer 136 is located between a surface of the ferrule retainer 116 and a surface of the housing 102 at the second end 106 of the housing 102. The lower portion 142 of the latch retainer 136 further includes projections 150 that are configured to engage with a duplex clip as will be discussed in more detail in reference to FIGS. 5A-5G. The projections 150 extend below the housing 102 and the back ferrule retainer 116.

As shown in FIGS. 1A-1D, the upper portion 138 of the latch retainer 136 has a curved shape to align a lower surface of the cross member 146 that engages with an upper surface of the latch member 122. In particular, the lower surface of the cross member 146 of the latch retainer 136 is substantially parallel with the upper surface of the latch member 122 to provide improved engagement therebetween.

The latch member 122 includes engagement members 152 that are configured to engage with another optical component when the latch member 122 is held in the engagement position by both the retainer spring 130 and the latch retainer 136, such as in the position shown in FIGS. 1A, 1B, and 1D In use, when the optical connector 100 is placed in an adapter, the engagement members 152 of the latch member 122 lock the optical connector 100 in place within the adapter. To disengage the engagement members 152 of the latch member 122 from the adaptor so that the optical connector 100 may be removed from the adaptor, a downward force is applied to the second end 128 of the latch member 122, such as by a user pressing the second end 128 of the latch member 122 toward the housing 102, thereby compressing the retainer spring 130. The movement of the second end 128 of the latch member 122 disengages the engagement members 152 of the latch member 122 from the adaptor and the optical connector 100 may then be removed from the adaptor. The upper through opening 140 of the upper portion 138 of the latch retainer 136 guides and limits the movement of the latch member 122. In some embodiments, the latch member 122 is longer than the flexible latch members that are integrated with the housing as currently being used in the art. The added length aids in the ability of a user to reach and press the latch member 122, as well as reducing any stresses that may occur in the latch member 122 when pressed.

The retainer spring 130 and the latch retainer 136 together provide a self-returning action that places the latch member 122, and thus the engagement members 152 of the latch member 122, back into the engagement position upon the user releasing the second end 128 of the latch member 122. Thus, the optical connector 100 is in position and ready to lock in another component or adaptor. Furthermore, by providing a latch member 122 that is a rigid member and does not flex in order to disengage from the adaptor, the life of the optical connector 100 may be extended. Thus, in some embodiments the latch member 122 can be made from different materials than in the prior art, which has been typically elastic plastic materials and integrated with the housing. For instance, in one embodiment the latch member 122 is made from a metal material. Alternatively, the latch member 122 may be made from molded plastic but may be made thicker or more rigid than in the prior art since the disengagement does not rely on flexing of the latch member 122 in order to disengage. The retainer spring 130 and the latch retainer 136 may be made of any suitable materials. In some embodiments, the retainer spring 130 is made of metal, such as stainless steel, and the latch retainer 136 is made an elastic material that is able to flex, particularly, the projections 150, the purpose of which will discussed below in reference to FIGS. 4 and 5. The housing 102 may be made from plastic or metal.

Figure 3:
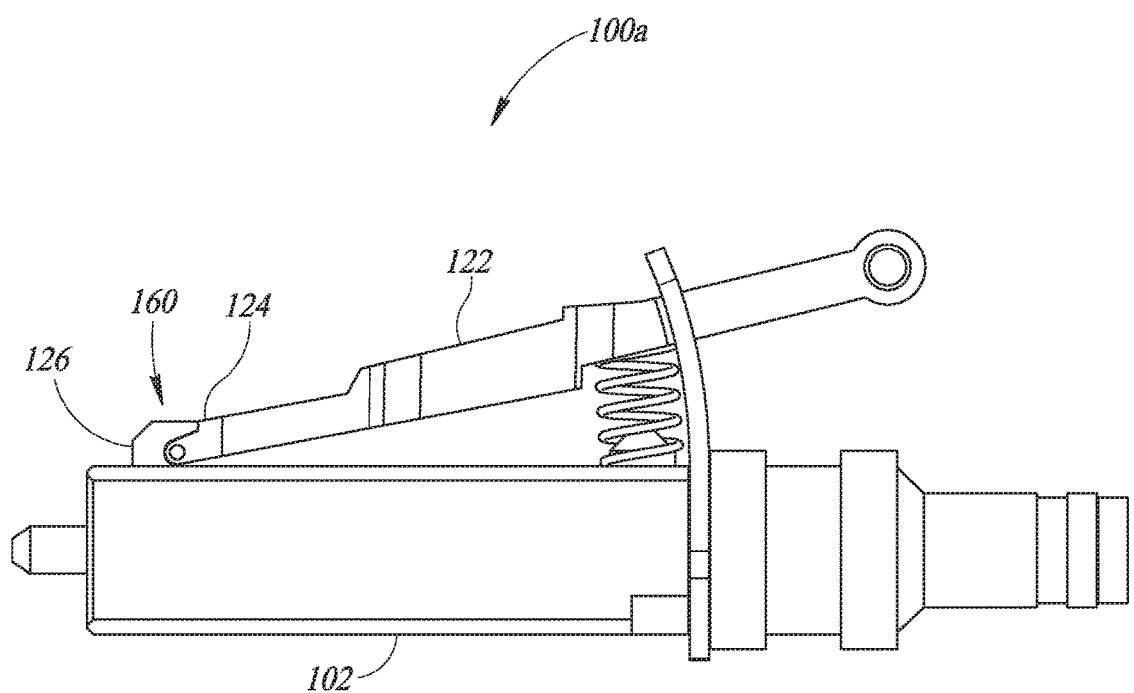
FIG. 3 is a schematic illustration of a side view of an optical connector in accordance with another embodiment.

As will be understood by persons of ordinary skill in the art, the first end 124 of the latch member 122 may be rotatably coupled to the housing 102 by any suitable structure. For instance, in another embodiment the first end 124 of the latch member 122 is rotatably coupled to the housing 102 by a lacking hinged joint, such as a pin hinged joint or knuckle pin hinged joint 160 as shown in the optical connector 100a of FIG. 3. In particular, the first end 124 of the latch member 122 of the optical connector 100a is rotatably coupled to the housing by the hinge or knuckle joint 160, which in the illustrated embodiment includes a pin that extends through an opening in the first end 124 of the latch member 122 and an opening in the housing hook 126. The remaining components of the optical connector 100a of FIG. 3 are substantially the same in structure and operation to the optical connector 100 of FIGS. 1A-1D and, thus, will not be repeated in the interest of brevity.

Figure 4A:
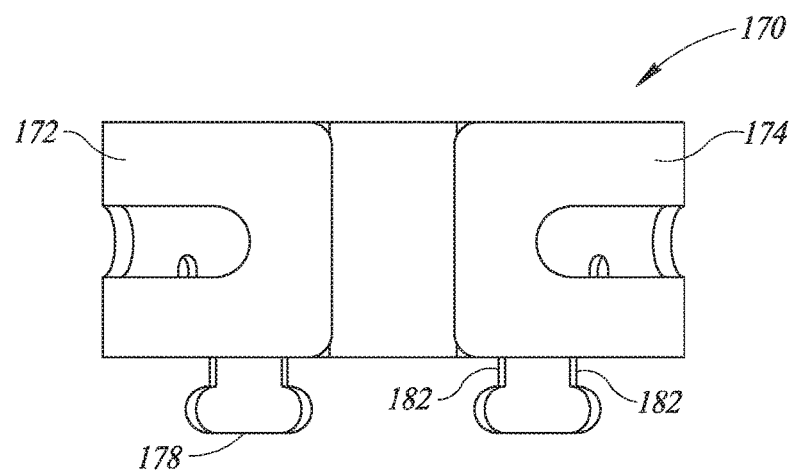
FIG. 4A is a schematic illustration of a top view of a duplex clip in accordance with one embodiment.
Figure 4B:
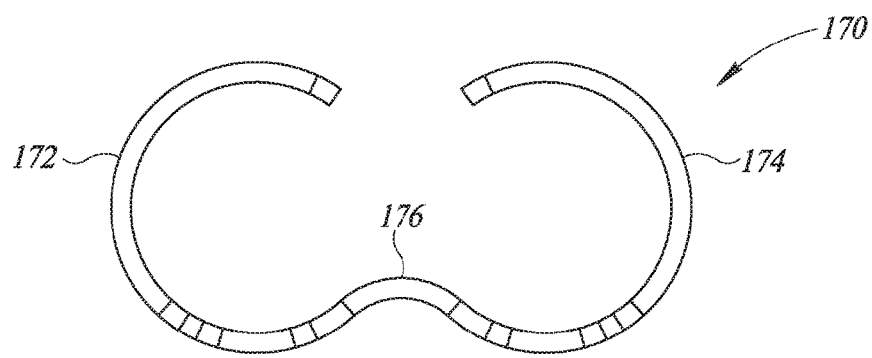
FIG. 4B is a schematic illustration of a side view of the duplex clip of FIG. 4A.
Figure 4C:
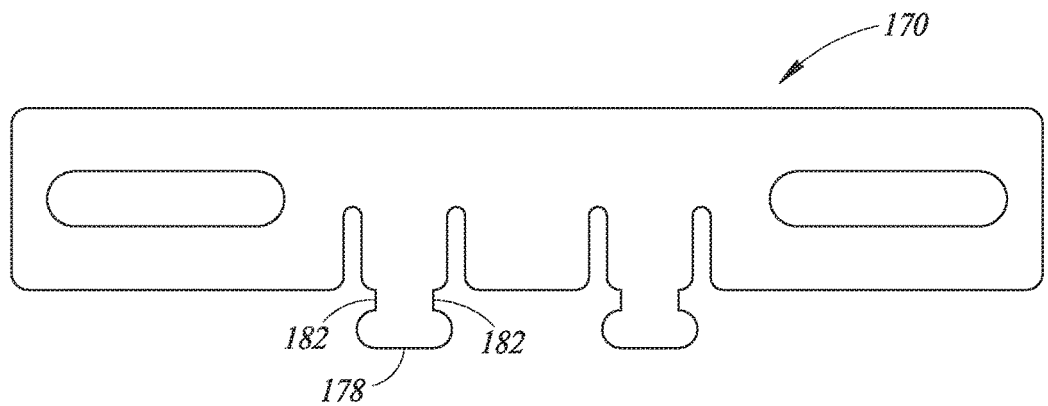
FIG. 4C is a schematic illustration of the duplex clip prior to being bent into the positions shown in FIGS. 4A and 4B.
Figure 5A:
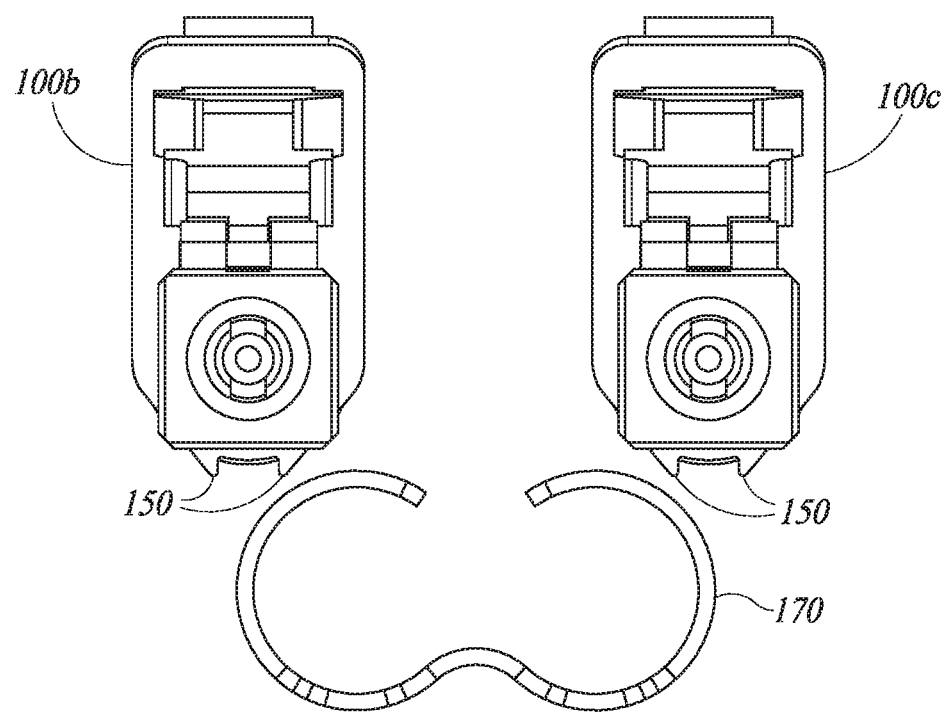
FIGS. 5A-5G are schematic illustrations showing various views of an assembly process for mounting optical connectors in the duplex clip to form a duplex connector assembly in accordance with one embodiment.
Figure 5B:
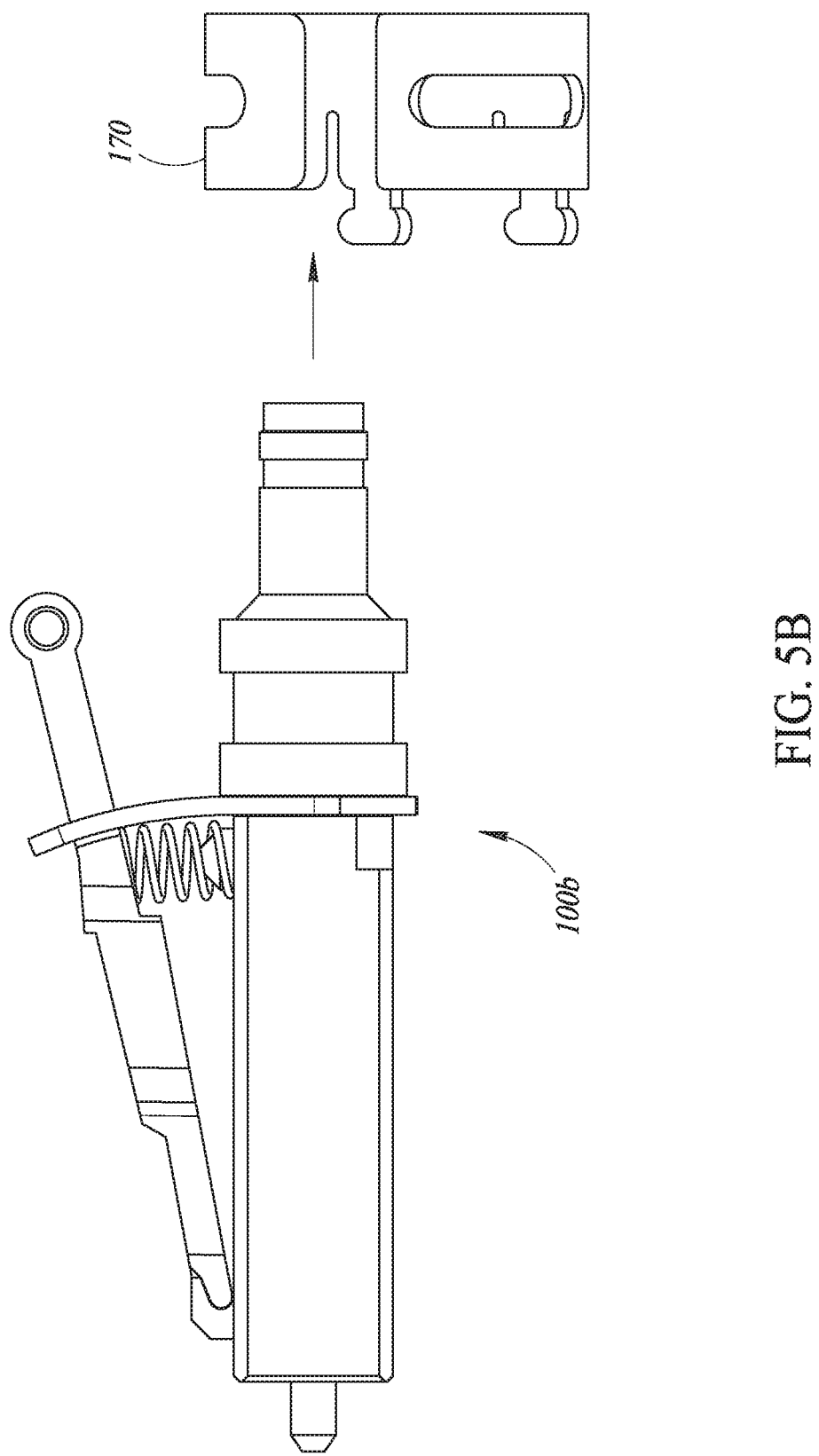
Figure 5C:
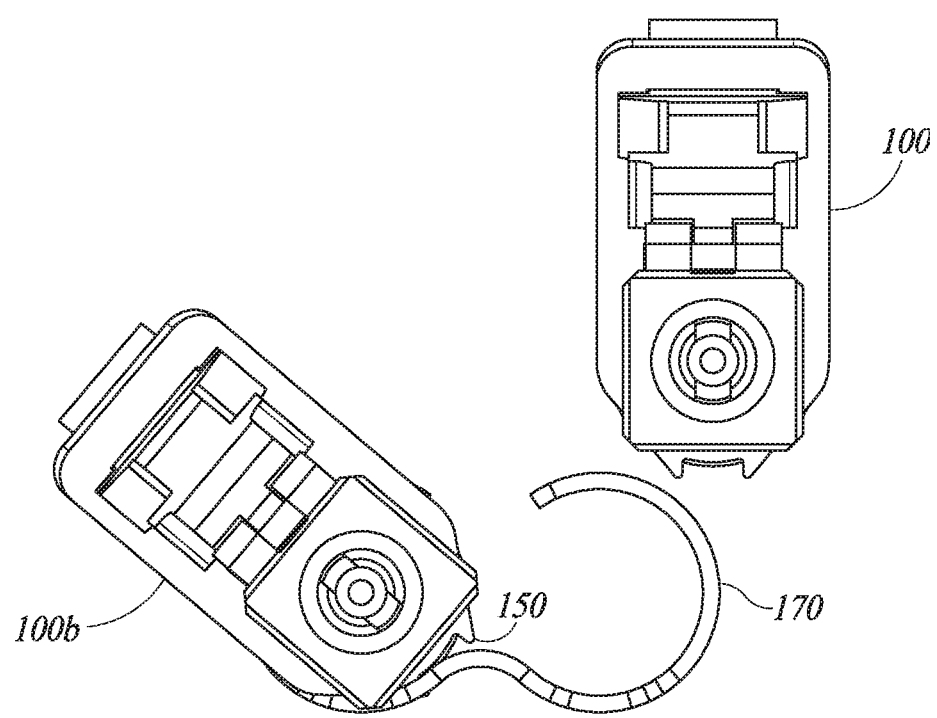
Figure 5D:
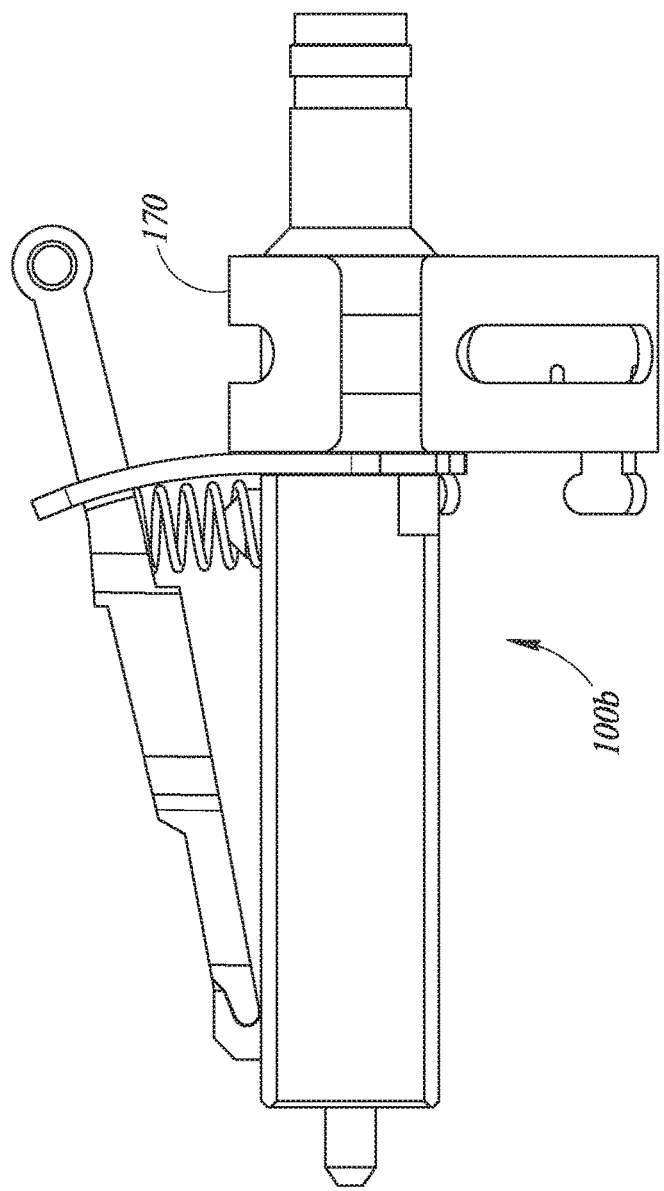
Figure 5E:
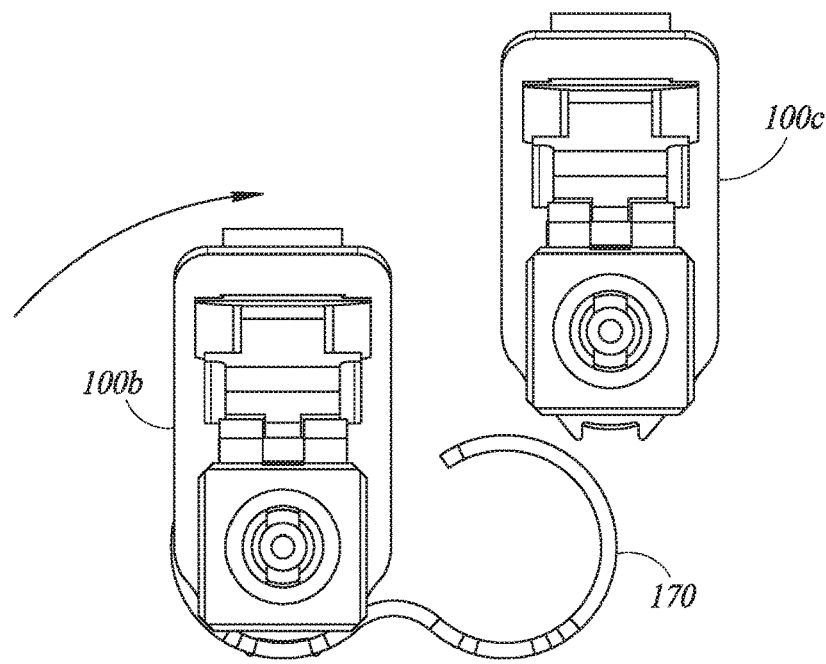
Figure 5F:
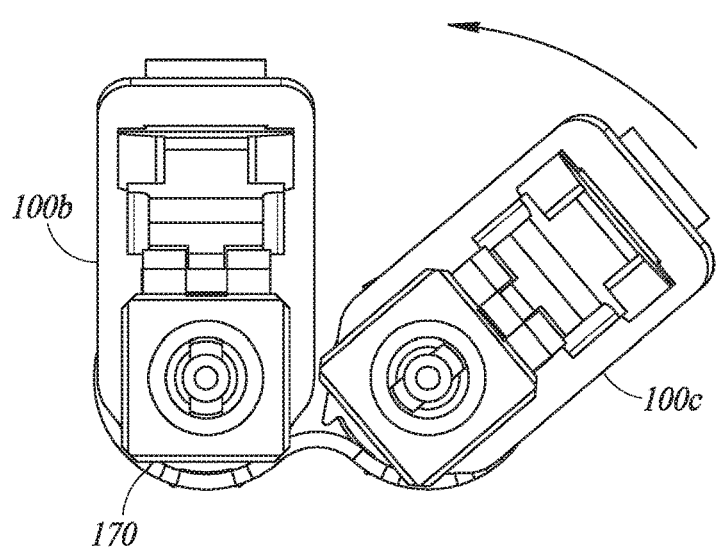
Figure 5G:
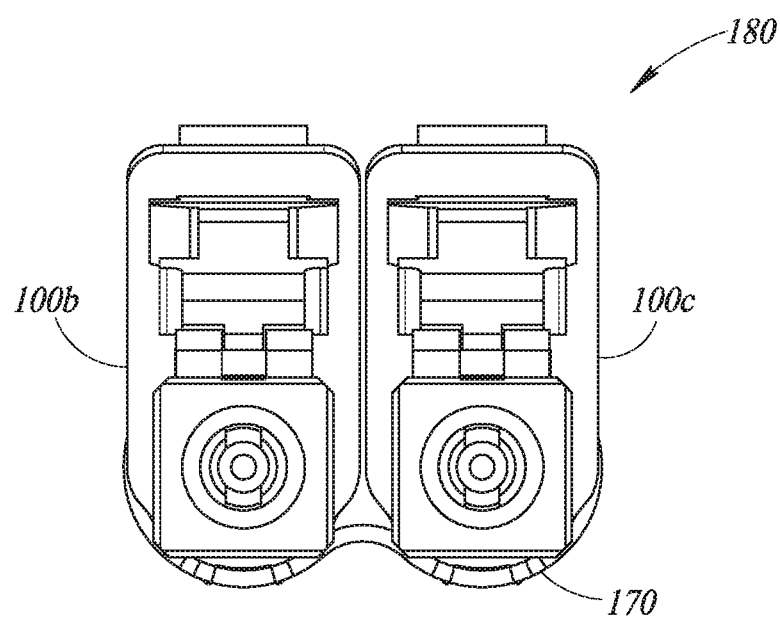

FIGS. 4A-4C illustrate a duplex clip 170 that is configured to hold two optical connectors, such as the optical connectors 100 and 100a of FIGS. 1 and 4, to form a duplex connector assembly 180 (FIG. 5G). FIG. 4A is a top view of the duplex clip 170 and FIG. 4B is a side view of the duplex clip 170. The duplex clip 170 includes first and second curved members 172, 174 that are generally C-shaped with the openings of the C-shapes facing each other as best shown in FIG. 4B. At a lower end of the duplex clip 170, the first and second curved members 172, 174 are coupled together by a bridge member 176, while at an upper end of the duplex clip 170 is an opening between the first and second curved members 172, 174. The first and second curved members 172, 174 are configured to receive optical connectors and hold the optical connectors, such as the optical connectors 100 and 100a, to form a duplex connector assembly 180 (FIG. 5G).

At the lower portion of the first and second curved members 172, 174 are tabs 178 that extend outwardly from a side of the first and second curved members 172, 174. The tabs 178 include recesses 182 on opposing sides for engaging with the optical connectors when the optical connectors are held in the duplex clip 170 For instance, the projections 150 of the latch retainer 136 of the optical connector 100 of FIGS. 1A-1D are configured to engage with the tabs 178 of the first and second curved members 172, 174 at the recesses 182. In particular, the projections 150 abut side surfaces of the tabs 178 at the recesses 182. In one embodiment, the tab 178 is configured to flex to engage with the projection 150.

FIG. 4C is a top view of a duplex clip 170 in a sheet material, such as a metal sheet, which in one embodiment is stainless steel, prior to being formed into the C-shapes and curved bridge member 176 shown in FIGS. 4A and 4B. As shown in FIG. 4C, the duplex clip 170 includes cutouts (removed material) for ease of forming the sheet material into the C-shapes to form the duplex clip 170 as shown FIGS. 4A and 4B In one embodiment, the duplex clip 170 is made of a sheet metal material.

FIGS. 5A-5G illustrate an assembly process for mounting first and second optical connectors 100b. 100c, which may be optical connectors 100, 100a of FIGS. 1, 3, into the duplex clip 170 to form a duplex connector assembly 180. In FIG. 5A, the first and second optical connectors 100b, 100c are oriented in a position with respect to a vertical axis. In this vertical-orientated position, the projections 150 of the latch retainers 136 are orientated parallel to the vertical axis.

In reference to FIG. 5B, the first optical connector 100b slides into the first curved member 172 of the duplex clip 170 in the direction indicated by the arrow in FIG. 5B while located in a first position that is orientated at an angle of approximately 50° relative to the vertical axis, as shown in FIG. 5C FIG. 5D shows the side view of the first optical connector 100b after having been slid into the first curved member 172 of the duplex clip 170.

As shown in FIG. 5E, the first optical connector 170b is rotated to a second position while in the first curved member 172, which orientates the first optical connector 170b vertically with respect to the vertical axis. While the first optical connector 170b is rotating from the first position as shown in FIG. 5C to the second position of FIG. 5E, the projection 150 on the left side in the figures engages with the tab 178 between the respective recesses 182. In one embodiment, a cam action, which is caused by the left projection 150 being pressed against the tab 178 as the first optical connector 100b is rotated from the first position to the second position, causes the tab 178 to flex. The slots that extend inward on the duplex clip 170 id in allowing the tab 178 to flex. When the first optical connector 170b is moved into the second position, the projections 150 are located in the recesses 182 at the side surfaces of the tab 178, and the tab 178 is no longer flexed.

To hold the first optical connector 100b in the first curved member 172, the projections 150 of the latch retainer 136 of the first optical connector 100b engage with the tab 178 at the recesses 182. In general, the projections 150 abut the side surfaces of the tab 178 at the recesses 182; however, the first optical connector 100b is able to move inside the first curved member 172 in order to allow suitable alignment with another component, such as a socket.

As shown in FIG. 5F, a second optical connector 100c slides through the opening and into the second curved member 174 while in the first position that is at an angle of approximately 50° relative to the vertical axis in an opposite direction. The second optical connector 100c is rotated to the second position and is fixed into the second curved member 174 in a similar manner as described above in reference to FIGS. 5B-5E but at a mirror image thereof. Similarly to the first optical connector 100b, the projections 150 of the latch retainer 136 of the second optical connector 100c engage with the tab 178 at the recesses 182. As shown in FIG. 5G, upon rotating the second optical connector 100c second position, the duplex connector assembly 180 is formed. The first and second optical connectors 100b, 100c are held in the first and second curved members 172, 174 in a way that allows some movement therein in order to allow suitable alignment with a duplex LC socket.

While the foregoing description describes various materials for the components of the optical connectors and the duplex connector, it should be understood any suitable material may be used. Furthermore, various shapes for the components of the optical connectors and the duplex connector may be different than shown and described. For instance, the protrusions of the latch retainer of the optical connectors may be any shape that is configured to engage with the tabs of the duplex clip.

The various features and embodiments described above can be combined in any manner to provide further embodiments. These and other changes can be made to the embodiments in light of the above-detailed description. In general, in the following claims, the terms used should not be construed to limit the claims to the specific embodiments disclosed in the specification, but should be construed to include all possible embodiments along with the full scope of equivalents to which such claims are entitled Accordingly, the claims are not limited by the specific embodiments disclosed.

The invention claimed is:

1. A connector, comprising:
   a housing having an outer surface and a cavity;
   a ferrule assembly located in the cavity of the housing;
   a rigid latch member having a first end removably and rotatably secured to the housing and a second end spaced apart from the housing, the latch member including engagement members configured to engage with another component when in an engagement position;
   a retainer spring having a first end abutting the housing and a second end abutting the latch member, the retainer spring configured to provide a force that pushes the second end of the latch member away from the housing; and
   a latch retainer configured to counteract the force provided by the retainer spring, wherein the retainer spring and the latch retainer together are configured to place the latch member in the engagement position.

2. The connector of claim 1, wherein the outer surface of the housing includes a raised portion or a recess, and the first end of the retainer spring rests on the raised portion or in the recess.

3. The connector of claim 2, wherein the latch member includes a recess or a raised portion, and the second end of the retainer spring is located in the recess or on the raised portion of the latch member.

4. The connector of claim 1, wherein the first end of the latch member is rotatably coupled to the housing by a housing hook having a recess that receives the first end of the housing, wherein the latch retainer is configured to maintain the first end of the latch member in the recess of the housing hook.

5. The connector of claim 1, wherein the first end of the latch member is rotatably coupled to the housing by a locking hinged joint.

6. The connector of claim 1, wherein the latch retainer has an upper portion that is curved and a surface of the upper portion of the latch retainer is parallel to a surface of the latch member.

7. The connector of claim 6, wherein the latch retainer includes protrusions that extend below the housing, wherein the protrusions are configured to engage with a duplex clip to hold the connector in the duplex clip.

8. The connector of claim 1, wherein the retainer spring is located next to the latch retainer, wherein the latch retainer includes a through opening that receives the latch member.

9. A connector component, comprising:
   a housing including an opening configured to receive a ferrule assembly;
   a rigid latch member having a first end removably and rotatably engaged with the housing and a second end spaced apart from the housing, the latch member including engagement members configured engage with another component when in an engagement position;
   a retainer spring between the housing and the latch member, the retainer spring configured to provide a force that pushes the second end of the latch member away from the housing; and
   a latch retainer configured to counteract the force provided by the retainer spring, wherein the retainer spring and the latch retainer together are configured to place the latch member in the engagement position.

10. The connector component of claim 9, wherein a surface of the housing has a raised portion and a first end of the retainer spring surrounds the raised portion.

11. The connector component of claim 10, wherein the latch member includes a recess and a second end of the retainer spring is located in the recess of the latch member.

12. The connector component of claim 9, wherein the housing includes a housing hook, wherein the latch member is removably and rotatably engaged with the housing by a first end of the latching member being located in a recess of the housing hook.

13. The connector component of claim 9, wherein the latch retainer includes protrusions to engage with a duplex clip configured to hold the connector.

14. A duplex connector assembly, comprising:
   a duplex clip including:
      first and second curved members that are coupled together by a bridge member; and
      first and second tabs extending from the first and second curved members; and
   wherein the first and second curved members are sized to receive and hold first and second connectors, respectively, the first and second connectors including first and second latch retainers, respectively, that include protrusions that engage with the first and second tabs of the duplex clip to hold the first and second connectors in position within the duplex clip.

15. The duplex connector assembly of claim 14, wherein the protrusions of the latch retainer of the first connector abut opposing sides of the first tab and the protrusions of the latch retainer of the second connector abut opposing sides of the second tab.

16. The duplex connector assembly of claim 15, wherein the first and second tabs are configured to:
   flex while the first and second connectors are being installed in the first and second curved members, and
   remain in natural positions, respectively, when the first and second connectors have been installed in the first and second curved members.

17. The duplex connector assembly of claim 16, wherein the first and second tabs include recesses and the protrusions abut the opposing sides of the tabs at the recesses.

18. The duplex connector assembly of claim 14, wherein the first connector includes a first housing and a first latch member that is rigid and coupled to at a first end to the first housing, wherein the second connector includes a second housing and a second latch member that is rigid and coupled at a first end to the second housing.

19. The duplex connector assembly of claim 18, wherein the first and second connectors include first and second retainer springs, respectively, configured to hold second ends of the first and second latch members away from the first and second housings, respectively.

20. The duplex connector assembly of claim 19, wherein the first and second latch retainers and the first and second retainer springs are configured to hold the first and second latch members of the first and second connectors in an engagement position.

21. The connector of claim 1, wherein the connector is an optical connector configured to be coupled to an optical communication link.

* * * * *